United States Patent [19]

Szymaszek

[11] Patent Number: 4,571,951
[45] Date of Patent: Feb. 25, 1986

[54] ELECTRONIC CONTROL FOR EXPANSION VALVE IN REFRIGERATION SYSTEM

[75] Inventor: Paul G. Szymaszek, Waukesha, Wis.

[73] Assignee: Vilter Manufacturing Corporation, Milwaukee, Wis.

[21] Appl. No.: 681,633

[22] Filed: Dec. 14, 1984

[51] Int. Cl.⁴ .............................................. F25B 41/00
[52] U.S. Cl. .......................................... 62/212; 62/225
[58] Field of Search .......................... 62/212, 225, 224; 236/92 B

[56]  References Cited
U.S. PATENT DOCUMENTS 2,260,682  10/1941  Robson ................................. 62/212
4,478,051  10/1984  Ibrahim ................................ 62/212
4,499,739   2/1985  Matsuoka et al. .............. 62/225 X Primary Examiner—William E. Wayner
Attorney, Agent, or Firm—James E. Nilles; Thomas F. Kirby

[57] ABSTRACT

A refrigeration system comprises a compressor, a condenser, a receiver, an evaporator, and an adjustably controllable expansion valve connected in the refrigerant supply line from the receiver to the evaporator. An electronic control system adjustably controls the expansion valve so as to maintain the maximum amount of liquid refrigerant in the evaporator while preventing flow of liquid refrigerant to the compressor. The electronic control system measures both the actual refrigerant temperature and refrigerant vapor pressure at a common point near the evaporator outlet port, converts the measured vapor pressure to a saturation temperature, determines the differential between the two temperatures and adjusts the expansion valve in accordance therewith, i.e., closing or opening in response to differentials below or above a set point, respectively.

3 Claims, 4 Drawing Figures

ELECTRONIC CONTROL FOR EXPANSION VALVE IN REFRIGERATION SYSTEM

BACKGROUND OF THE INVENTION

1. Field of Use

This invention relates generally to a refrigeration system comprising an adjustably controllable expansion valve connected in a refrigerant supply line from a receiver to an evaporator. In particular, it relates to an improved electronic control system for adjusting said expansion valve in accordance with refrigeration system conditions.

2. Description of the Prior Art

A typical prior art refrigeration system generally comprises a motor-driven compressor to compress gaseous refrigerant, a condenser in which compressed gas from the compressor liquifies, a receiver for the liquid refrigerant, an evaporator in which the liquid evaporates prior to returning to the compressor, and an adjustably controllable expansion valve connected in the liquid refrigerant supply line from the receiver to the evaporator. Such a refrigeration system also usually comprises control means or system to adjust the expansion valve so as to control superheat and thereby maintain the maximum amount of liquid refrigerant in the evaporator for cooling efficiency while preventing possibly damaging flow of liquid refrigerant to the compressor. U.S. Pat. No. 3,577,743 issued May 4, 1971 to Long and assigned to the same assignee as the present patent application discloses one type of such a prior art rtefrigeration system and expansion valve control means. That prior art control means employs first and second temperature sensors or probes located at two widely separated points in the system i.e., in the refrigerant inlet port and in the refrigerant outlet port of the system evaporator to control the superheat condition of the system refrigerant. One temperature sensor senses the temperature of mixed liquid and gaseous phase refrigerant near the evaporator inlet while the other temperature sensor senses the temperature of gaseous phase refrigerant near the evaporator outlet. The two temperature sensors are connected to a temperature differential determining means which regulates the system expansion valve in accordance with a desired differential temperature or superheat condition between the liquid and gaseous phase refrigerant. The sensor at the inlet senses the saturation temperature of the refrigerant at the pressure existing at the inlet. The other sensor measures the temperature of the refrigerant vapor at the evaporator outlet. The difference of these temperatures is the superheat. Generally, there is a pressure drop associated with an evaporator, particularly a direct expansion type evaporator. However, the pressure drop through such an evaporator results in an incorrect superheat reading if done in the above-described manner unless other measures are taken.

To illustrate this problem, if, for example, the pressure at the evaporator inlet were 3.6 psig, this would correspond to a $-20°$ F. saturation temperature if ammonia were the refrigerant. If the above-described expansion valve superheat control were set to maintain a $10°$ F. superheat, the temperature at the outlet would be $-10°$ F. This is a $10°$ superheat when compared to the $-20°$ F. saturation temperature at evaporator inlet. If, however, there were a 2.8 psi pressure drop through the evaporator, a pressure of 0.8 psig (3.6−2.8) would be present at the outlet. A pressure of 0.8 psig corresponds to a saturation temperature of $-26°$ F. Therefore, at the outlet the superheat is $[-10° F.-(-26° F.)] = 16°$ F. and not the $10°$ F. that was set. With the greater amount of superheat, the system is not making full use of available evaporator capacity. This is one disadvantage of the afore-described prior art system. There are various solutions available to circumvent this shortcoming, however, all are costly. However, just setting the expansion valve control lower to compensate for pressure drop can also create problems. If, for instance, in the foregoing example the controller was set for $4°$ F. superheat to compensate for the $6°$ F. lost due to pressure drop, then a problem arises due to an evaporator load reduction when the refrigerant flow is reduced. Of course, with reduced refrigerant flow, there is reduced pressure drop and less need for $6°$ F. compensation. Trying to compensate for pressure drop in this manner is not an ideal solution.

Another problem with the above-described prior art control system centers around start-up. The control system is designed such that when a superheat that is higher than set point is reached, a signal is sent to the adjustable expansion valve which begins to open and feeds more liquid refrigerant to the evaporator. The expansion valve continues to modulate until it is positioned to maintain the set point. At start-up after a prolonged shutdown (one day, for example), the two temperature sensors are at the same temperature thereby indicating $0°$ superheat. When the refrigeration system is started, the expansion valve remains closed, not allowing liquid refrigerant into the evaporator, and without allowing liquid into the evaporator superheat will not be established, nor will any cooling occur. To correct this problem, a timer is used to electrically force the expansion valve to open for a period of time, ideally long enough to establish liquid flow and a superheat condition, but not so long as to overfeed the evaporator and allow liquid refrigerant to enter the compressor. With any number of variables affecting the time period needed to establish liquid flow, use of a timer also is not an ideal solution.

The prior art also contains U.S. Pat. No. 4,375,753 issued Mar. 8, 1983 to Imasu et al and showing the use of temperature sensing thermistors at various points in refrigeration systems to effect expansion valve control.

It is desirable, therefore, to provide improved control systems for expansion valves in refrigeration systems to avoid or overcome the aforesaid problems.

SUMMARY OF THE INVENTION

In accordance with the invention there is provided a refrigeration system which comprises a motor-driven compressor to compress gaseous refrigerant, a condenser in which compressed gas from the compressor liquifies, a receiver for the liquid refrigerant, an evaporator in which the liquid evaporates prior to returning to the compressor, and an adjustably controllable expansion valve connected in the liquid refrigerant supply line from the receiver to the evaporator refrigerant inlet. An electronic control means or system in accordance with the invention is provided to adjust the expansion valve so as to control superheat at an adjustable predetermined set amount and thereby to maintain the maximum amount of liquid refrigerant in the evaporator for cooling efficiency while preventing possibly damaging flow of liquid refrigerant from the refrigerant outlet of evaporator to the compressor.

The electronic control means or system in accordance with the invention comprises a temperature sensing transducer (thermistor) for sensing the acutual temperature of refrigerant vapor in the return line from the evaporator to the compressor at a sensing point near the evaporator outlet. The electronic control means or system also comprises a pressure sensing transducer (strain gauge type) for sensing refrigerant vapor pressure at the aforementioned same sensing point near the evaporator outlet. The two transducers each provide analog type electric output signals. The electronic control system further comprises three-mode PID circuitry, including A/D and D/A converters, a microprocessor, and a memory. The control means or system operates to receive and convert the analog electric output signals from the two transducers to digital signals, to convert the digital signal of the pressure sensing transducer to a signal representing the actual saturation temperature of the specific type of refrigerant (Freon, ammonia, etc.) being used in accordance with formulae programmed in the control system microprocessor and memory, to compare the difference, if any, between the two temperature signals, to ascertain the real superheat condition at the evaporator outlet and to express it as a digital output signal, to convert the latter signal to an analog control signal and to adjust the expansion valve in accordance with the differential as expressed by the analog control signal. It is to be understood that actual temperature at the aforesaid sensing point is always equal to or greater than the saturation temperature at the same sensing point. A small differential below the set amount causes the expansion valve to adjust toward the closed position to allow the superheat to increase to the set amount. Conversely when the differential is larger than the set amount, the expansion valve is adjusted toward the open position to reduce the superheat to the set amount.

An electronic control system in accordance with the present invention offers several advantages over the prior art. For example, it eliminates the two problems hereinbefore discussed in connection with prior art systems because, instead of sensing and measuring two temperatures at two different points in the evaporator (i.e. refrigerant inlet and outlet) and using the differential to determine superheat, the present invention senses and measures an actual temperature and a calculated saturation temperature at a common point, i.e., at a common point near the evaporator outlet, to determine superheat. Thus, the problem of measuring pressure drop between two points and somehow compensating for it is eliminated. Secondly, at start-up, the problem of getting the expansion valve to open is solved. When first started, in the control system the pressure and temperature probes will be indicating 0° superheat. However, once the compressor starts, the evaporator pressure will decrease while the temperature won't. Then the superheat becomes greater than the set amount, the microprocessor will detect a need for less superheat (pressure low, temperature high) and open the valve to reduce the superheat to the set amount.

A control system in accordance with the present invention is relatively simple and compact and economical to fabricate, install and service. Other objects and advantages of the invention will hereinafter appear.

IN THE DRAWINGS

DESCRIPTION OF A PREFERRED EMBODIMENT

Figure 1:
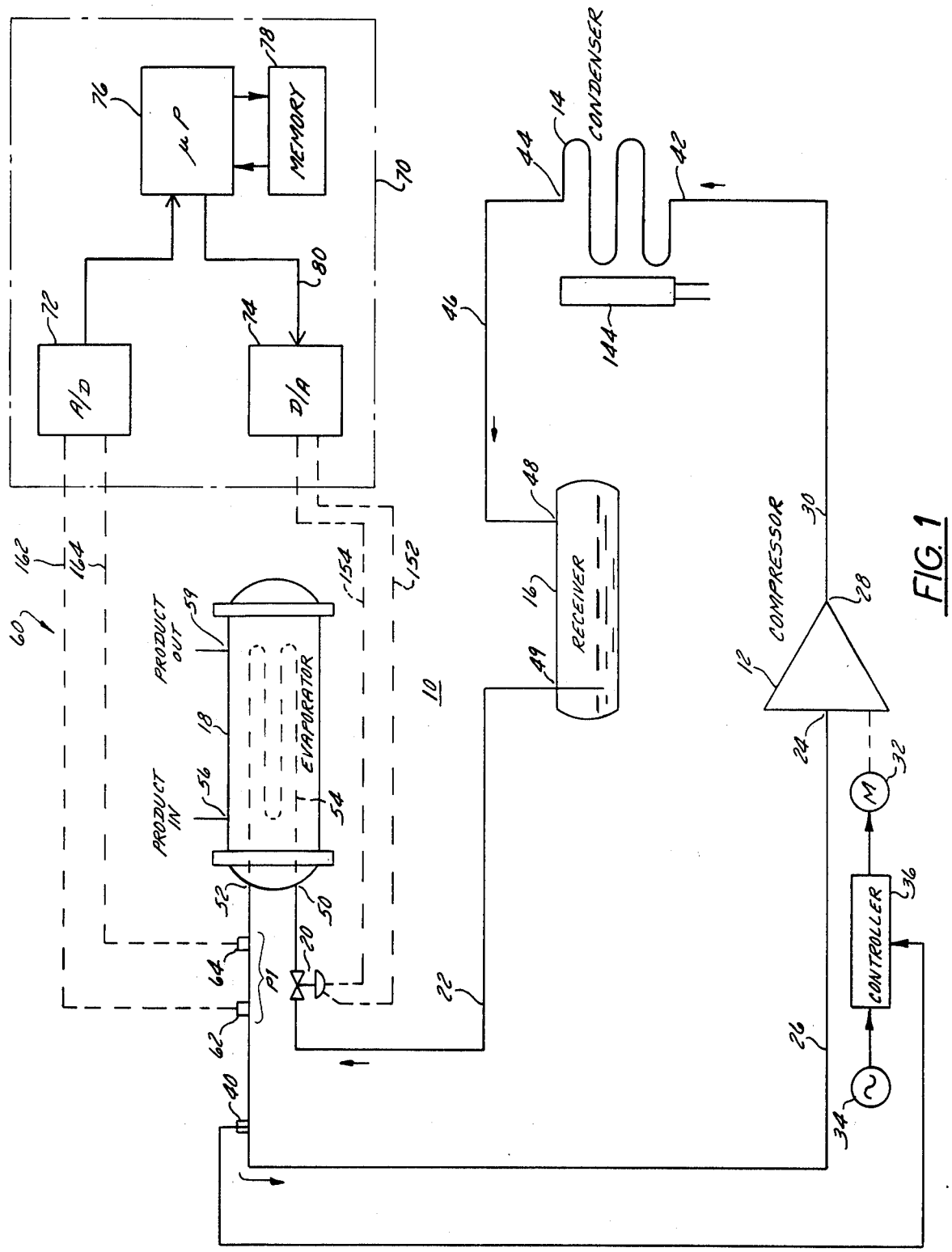
FIG. 1 is a schematic diagram showing the major components of a refrigeration system and electronic control system therefor in accordance with the present invention.

FIG. 1 shows a refrigeration system 10 of a type with which the present invention is advantageously employed. Refrigeration system 10 comprises a motor-drive compressor 12 to compress gaseous refrigerant, a condenser 14 in which compressed gas from the compressor liquifies, a receiver 16 for the liquid refrigerant, an evaporator 18 in which the liquid evaporates prior to returning to the compressor, and an adjustably controllable expansion valve 20 connected in the liquid refrigerant supply line 22 from the receiver 16 to the evaporator 18 refrigerant inlet. An electronic control means or system 60 in accordance with the invention is provided to adjust the expansion valve 20 so as to control superheat and thereby to maintain the maximum amount of liquid refrigerant in the evaporator for cooling efficiency while preventing possibly damaging flow of liquid refrigerant from the refrigerant outlet of evaporator to the compressor. The electronic control system 60 comprises a temperature sensing transducer (thermistor) 62 for sensing the actual temperature of refrigerant vapor in a return line 26 from the evaporator 18 to the compressor 12 at a sensing point P1 near the evaporator. Transducer 62 may, for example, take the form of a Type 21B device produced by RdF Corporation. The electronic control system 60 also comprises a pressure sensing transducer (strain gauge type) 64 for sensing refrigerant vapor pressure at the same sensing point P1. Transducer 62 may, for example, take the form of a Model EA device produced by Data Instruments Inc., Lexington, MA 02173. The electronic control system 60 further comprises a three-mode PID circuit, generally designated 70 in FIGS. 1 and 5, to receive and convert the analog electric output signals from the two transducers 62, 64 to digital signals, to convert the digital signal of the pressure sensing transducer 64 to a signal representing the saturation temperature in accordance with formulae stored in the control system memory, to compare the difference, if any, between the two temperature signals, and to adjust the expansion valve 20 in accordance with the differential. Actual temperature is always equal to or greater than the saturation temperature. A small differential indicates that liquid is present at the sensing point P1 and the expansion valve 20 is adjusted toward closed position. Conversely, a large differential indicates that vapor is present at the sensing point P1 and the expansion valve 20 is adjusted toward open position.

Referring to FIG. 1, compressor 12 includes an inlet port 24 for receiving low pressure gaseous refrigerant through pipe line 26 from evaporator 18 and an outlet or discharge port 28 for delivering compressed high pressure through a pipe line 30 to condenser 14. Compressor 12 is driven by an electric motor 32 which is energizable from an electric power source 34 through a motor controller 36 which is responsive to a sensing device 40 which is responsive to a system condition such as temperature or pressure to turn the compressor 12 on or off as required.

The high pressure gaseous refrigerant is supplied to an inlet port 42 of condenser 14 and is condensed therein to a liquid phase as by giving off heat to a circulating water jacket 144. The liquid refrigerant is then supplied from a condenser outlet port 44 and through a pipeline 46 to an inlet port 48 in receiver 16 for storage in the receiver 16 until needed for circulation. The liquid in receiver 16 is then supplied from receiver port 49 through pipe line 22 and valve 20 to evaporator 18. Evaporator 18 includes a refrigerant inlet port 50 and a refrigerant outlet port 52 which are interconnected by a coiled pipe 54 which receives low temperature refrigerant in a liquid phase at inlet port 50 and discharges refrigerant in a high temperature gaseous phase at outlet port 52. Evaporator 18 also includes a product inlet port 56 and a product outlet port 59 for receiving and discharging water or other fluid which is cooled by a coiled pipe 54 in evaporator 18 and is circulated to a chill room or chamber (not shown) in which a product (not shown) to be cooled is located.

Figure 2:
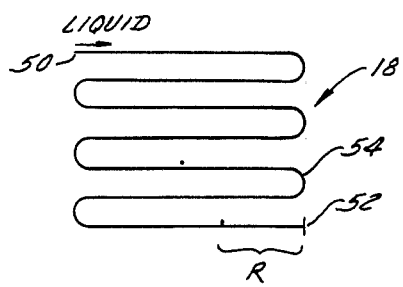
FIG. 2 is an enlarged schematic view of the interior of the evaporator shown in FIG. 1.

As FIG. 2 shows, a portion designated R of coiled pipe 54 near refrigerant outlet port 52 of evaporator 18 is the region wherein superheating should normally or ideally 15 occur so that refrigerant in a gaseous phase rather than in a liquid phase is discharged from port 52 to pipe line 26 which supplies the compressor 12. Entry of liquid refrigerant into compressor 12 can damage the compressor since liquid, unlike a vapor, is not compressible. It is desired, therefore, to maintain a predetermined amount of superheat in coil portion R and this is accomplished by regulating expansion valve 20.

FIG. 1 shows valve 20 in symbolic form but it is understood to be a pneumatically actuated electronically controlled valve which is employed to meter the flow of refrigerant to inlet port 50 of evaporator 18. Valve 20 may be a diaphragm operated valve in which pneumatic pressure supplied through supply line 22 to inlet 50 raises or lowers the diaphragm to operate valve 20. The valve 20, which may be similar to that shown in the aforementioned U.S. Pat. No. 3,577,743, is understood to include an electropneumatic transducer (not shown) which converts the electric signals in conductors 152 and 154, generated by control means 70, to a pneumatic signal having corresponding control pressure variations. The electropneumatic transducer (not shown) includes a solenoid (not shown), the coil 19 of which receives the electric signals in conductors 152 and 154. The position of the plunger (not shown) of the solenoid (not shown) is a function of the energization of the coil 19 provided by the electric signal from control circuit 70. A commercially available electropneumatic transducer for valve 20 which may be employed in the control means 60 is made and sold by the Fisher Governor Company, Marshalltown, Iowa under the model designation type 546. In the operation of the control means 60, sensors 62 and 64 function to provide output signals in conductors 162 and 164 to control circuit 70. The output signal in conductors 152, 154 drives the transducer.

Figures 3, 4:
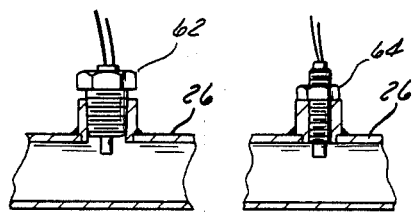
FIG. 3 is a greatly enlarged cross-sectional view of the temperature transducer shown in FIG. 1.
FIG. 4 is a greatly enlarged cross-sectional view of the pressure transducer shown in FIG. 1.

As previously explained, the electronic control means 60 is provided to adjustably control (open and close) the expansion valve 20 so as to control superheat to maintain the maximum amount of liquid refrigerant in the evaporator 18 while preventing flow of liquid refrigerant from the refrigerant outlet 52 of evaporator 18 to the compressor 12. The electronic control means 60 comprises temperature sensing transducer (thermistor) 62 for sensing the actual temperature of refrigerant vapor in the return line 26 from the evaporator 18 to the compressor 12 at sensing point P1 near the evaporator outlet 52. FIG. 3 shows the manner in which thermistor 62 is mounted in line 26 at sensing point P1. The electronic control system 60 also comprises pressure sensing transducer (strain gauge type) 64 for sensing refrigerant vapor pressure at the aforementioned same sensing point P1 in line 26 near the evaporator outlet 52. FIG. 4 shows the manner in which transducer 64 is mounted in line 26 at sensing point P1. It is to be understood that transducers 62 and 64 are to be mounted as close to each other as their physical construction permits so that both sense conditions at or as near to common point P1 as is practical. The two transducers 62 and 64 each provide analog type electric output signals on the conductors 162 and 164, respectively.

Figure 5:
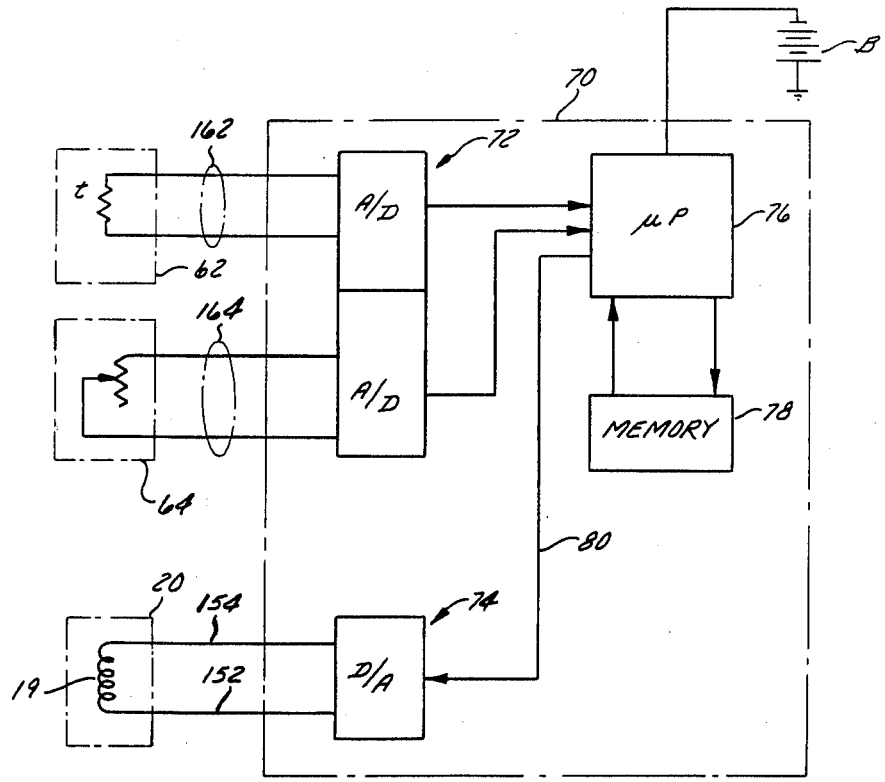
FIG. 5 is a more detailed electric circuit diagram of portions of the control system shown in FIG. 1.

As FIGS. 1 and 5 show, the electronic control means 60 further comprises the three-mode PID (Proportional, Integral, Derivative) circuit 70, including A/D (analog to digital) converter 72, D/A (digital to analog) converter 74, a microprocessor (P) 76, and a memory 78. The converter 72 operates to receive and convert the analog electric output signals from the two transducers 62 and 64 to digitial signals, to convert the digital signal of the pressure sensing transducer 64 in microprocessor 76 to a signal representing the actual saturation temperature of the specific type of refrigerant being used in accordance with formulae programmed in the control system microprocessor 76 and memory 78, to compare the difference, if any, between the two temperature signals, to ascertain the real superheat condition at the evaporator outlet 52 and to provide it as a digital output signal on a conductor 80, to convert the latter signal in converter 74 to an analog control signal on lines 152 and 154 and to adjust the expansion valve 20 in accordance with the differential as expressed by the analog output signal on lines 152 and 154.

Thus, control means 60 senses and measures an actual temperature by device 62 and a calculated saturation temperature by device 64 (and microprocessor 76) at a common point P1 near the evaporator outlet 52, to determine superheat. Thus, the problem of measuring pressure drop between two widely different points and somehow compensating for it is eliminated. In addition, the problem of getting the expansion valve 20 to open at start-up is solved. When first started, in the control 70 the pressure and temperature probes 62 and 64 will be indicating 0° superheat. However, once the compressor 12 starts, the evaporator 18 pressure will decrease while the temperature will not. The microprocessor 76 will detect a need for less superheat (pressure low, temperature high) and will open valve 20.

The control means 70, which is energized from a power source such as battery B, employs known commercially available components in its converters 72 and 74, in its microprocessor 76 and memory 78.

I claim:

1. A refrigeration system in which refrigerant is circulated and comprising:
   an evaporator having an inlet port and an outlet port for refrigerant;
   an electrically operated adjustably controllable expansion valve connected to supply refrigerant to said inlet port;

and control means for measuring both the actual and saturation temperatures of refrigerant at a point near said outlet port of said evaporator and for adjusting said expansion valve in proportion to the temperature differential between both of said temperatures so that said expansion valve is adjusted toward closed position or open position when said temperature differential is below or above a predetermined value, respectively, said control means comprising:

a pressure sensing transducer in the form of a strain gauge for measuring refrigerant vapor pressure at said point;

a temperature sensing transducer in the form of a thermistor for measuring actual refrigerant temperature at said point;

each of said transducers providing analog electric output signals;

analog-to-digital converter means for converting said analog electric output signals to digital signals;

microprocessor means for converting the digital signals representing refrigerant vapor pressure to derived digital signals representing saturation temperature of said refrigerant, for measuring the differential temperature between said actual refrigerant temperature and said saturation temperature, and for providing digital output signals representing said temperature differential;

and digital-to-analog converter means for converting said digital output signals to analog control signals for adjustably controlling said expansion valve.

2. A refrigeration system in which refrigerant is circulated and comprising:

a compressor;

a condenser supplied with refrigerant from said compressor;

a receiver supplied with refrigerant from said condenser;

an evaporator having a refrigerant inlet port supplied with liquid refrigerant from said receiver and a refrigerant outlet port for supplying vaporized refrigerant to said compressor;

an electrically operated adjustably controllable expansion valve connected between said receiver and said inlet port of said evaporator and adjustable to maintain the maximum amount of liquid refrigerant in said evaporator while preventing flow of liquid refrigerant to said compressor, said expansion valve being adjustable toward closed position or open position when said differential temperature is below or above a predetermined setting, respectively;

and control means to adjust said expansion valve and comprising:

means for measuring the actual temperature of refrigerant at a point near said outlet port of said evaporator;

means for measuring the vapor pressure of said refrigerant at said point;

means for converting said vapor pressure to saturation temperature and means for measuring the temperature differential between said temperatures and for adjusting said expansion valve accordingly, said means being responsive to a decrease in vapor pressure compared to high temperature upon start-up of said compressor to effect opening of said expansion valve upon compressor start-up to reduce superheat conditions to said predetermined value.

3. A refrigeration system according to claim 1 wherein said control means further comprises programmable memory means cooperable with said microprocessor means and adapted to store saturation temperature data for a plurality of specific refrigerants.

* * * * *